March 10, 1970  H. R. BREKKE  3,500,465
PORTABLE ELECTRICALLY ACTUATED ROADSIDE WARNING LIGHT
Filed March 13, 1968

Harvey R. Brekke
INVENTOR.

United States Patent Office 3,500,465
Patented Mar. 10, 1970

3,500,465
PORTABLE ELECTRICALLY ACTUATED
ROADSIDE WARNING LIGHT
Harvey R. Brekke, 615 SW. 4th St.,
Madison, S. Dak. 57042
Filed Mar. 13, 1968, Ser. No. 712,712
Int. Cl. B60g 7/00
U.S. Cl. 340—119          1 Claim

ABSTRACT OF THE DISCLOSURE

An emergency light having hinged protectors for the lights which can be folded down and held in a lower position to provide a stable base for the light.

---

This invention pertains to emergency lights for use with automobiles, trucks, or other conveyances to indicate an emergency.

When an automobile, truck or the like is disabled on a roadway because of engine trouble, tire problems or the like, a dangerous situation may very well exist. This is particularly true at night and on roads with narrow shoulders.

In the past, various types of reflectors, fusees and the like have been utilized to warn other traffic of the hazard. More recently, flasher signals for automobiles which cause simultaneous flashing of signal lights on both front and rear of the automobile are mandatory equipment. There are, however, certain drawbacks to all these types of equipment. For instance, reflectors are effective only when struck by a strong light. Scattering light from the periphery of the headlight beams is not adequate to give a good warning. Therefore, the reflectors must be carefully set. Fusees burn for only a limited time and protect for only that time. Flashers on the auto are probably most effective, but are available only on the most recent cars. Furthermore, they are not visible beyond the crest of a hill or the like.

It is my purpose to provide a stable flashing light for emergency use. The light is easily portable, well protected against damage while carried, and stable in use. It may be either self contained or operated from an electrical system in an automobile or other conveyance.

A better understanding of my invention in its embodiment may be had from a study of the following specification and the figures in which.

Figure 1:
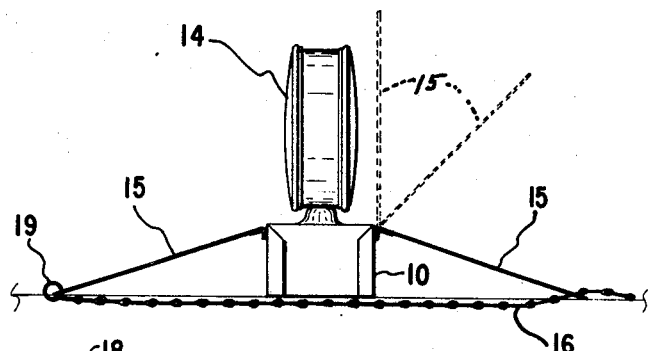
FIG. 1 is an end elevational view of my device set up for use.

Briefly my invention comprises an emergency light which includes hinged covers for the protection of the lenses or the light units. The covers are usable as a stable base when the device is in use. Means may also be used to provide some measure of visibility beyond the crest of a hill or the like.

More specifically and with reference to the figures, my device comprises a box-like base 10. This base contains much of the wiring, the flasher element or elements, and may contain batteries if the device is to be self contained. In the alternative, I may also provide a cord 11 having a plug 12 which can be inserted into the cigarette lighter receptacle on the dash board of the automobile. It will be further understood that the device could be made to utilize both sources of power in the alternative by using a switch on the box to switch from one power source to the other. This device is not illustrated since it is well within the skill of an ordinary mechanic.

One or more light units 14 are mounted on the box 10. These are preferably double faced units which are visible from both sides. It is envisioned that one side might be provided with an amber lens and the other with a red lens, but this may depend on safety regulations of the various highway departments where the device is used.

Figure 4:
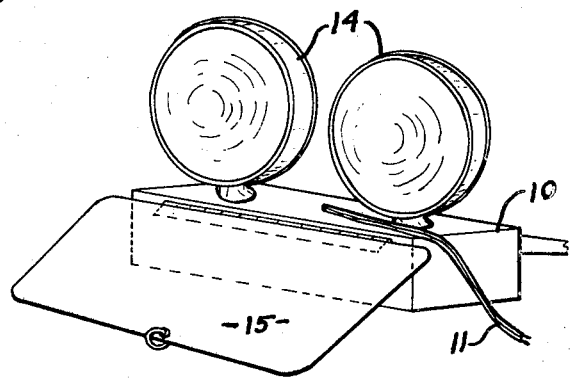
FIG. 4 is a pictorial view of the device of FIG. 1.

Covers 15 are hinged to the box 10 near its upper edges. Thus, when the covers are open (FIGS. 1 and 4) they provide an extended wing forming a triangle between the box, the ground and the cover. A chain 16 or similar flexible link is fastened to the outer edge of one cover and is releasably attached to the other to hold the covers in this open position. A chain is a preferred link for this purpose, since then the releasable connection to the second cover may be provided easily by using a notch 18 in the cover into which the chain 16 may be inserted and in which it will be held by the interlocking links.

In the closed position (FIG. 3) the covers 15 are raised, and the flexible link or chain 16 is wrapped around the entire device and fastened again to loop 19 or the like which attaches the chain to the one cover. The covers are large enough to cover the lenses to protect them from damage. Thus a compact enclosure is provided so that the device may be easily and safely stowed in the luggage compartment of an automobile or some similar space in any other type of conveyance.

While it is not essential to the use of my device as described thus far, I envision that the covers 15 may be made of a reflective material to make available additional advantages. For example, as shown in FIG. 1, one of the covers might be held in a vertical position behind the light units. This could then provide a reflective surface to intensify the projection of the light in one direction. If the units were used in pairs, this might be a desirable feature. Some of the stability would be sacrificed, but it might be that the additional reflectiveness would be more important in certain instances.

Another posible use of a reflective cover might be to throw a beam of light upward. Thus, the reflective cover might be set at an angle of about 45 degrees to the horizontal. In this position, light from the adjacent lens would be reflected into the air where the beam would provide a warning which might be seen over the crest of a hill or the like.

Figure 2:
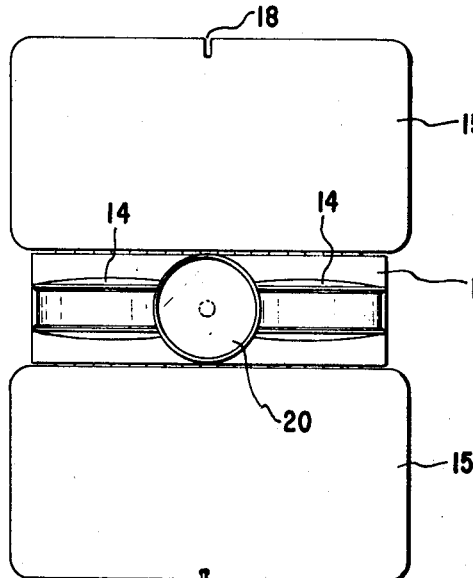
FIG. 2 is a top plan view of an alternative device also set up for use.
Figure 3:
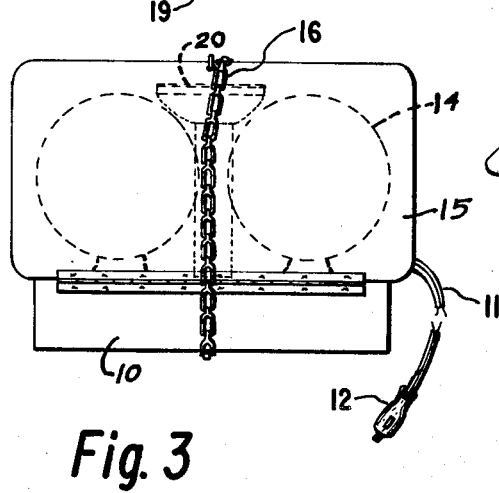
FIG. 3 is a front elevational view of my device of FIG. 2 closed for carrying.

Warnings by a vertical beam could be similarly provided by the alternative embodiment illustrated in FIGURES 2 and 3. In this embodiment, an additional light unit 20 is fixed to the box 10. This unit is a single lens device having a reflector behind the light to provide a concentrated beam. The unit 20 is mounted so that the beam is directed vertically to provide a warning light visible beyond the horizon. This unit 20 is not necessarily connected to the flasher, since it might be confused with other flashing signs, emergency vehicles or the like if it were, but rather may be connected to provide a continuous beam.

The use of my device will be obvious from its description. However, it should be noted that enough light is available from the units to provide working lights while changing a tire or the like also. It might also be suggested that a large number of minor variations are conceived. For instance, the number of units may be varied and individual units each provided with a switch. Thus, a choice could be made as to whether to conserve power by using one unit or to provide maximum visibility by using two or three units. Also, a switch could be provided to cut the flasher out of the circuit to provide a steady beam from the light units.

I claim:

1. An emergency signal comprising a box-like base adapted to be supported on a supporting surface and having upper edges appreciably above said supporting surface, said base being adapted to contain working parts for said signal, lamp means mounted on said base, reflective cover means hinged to said base at said upper edges and adapted to cover at least a substantial part of said lamp means when said cover means are in a closed position, flexible means attached to one portion of said cover means, said flexible means being of such length that it can be wrapped around said cover means in the closed position to hold the cover means in that position, said cover means being movable to an open position in which the outer portions of said cover means approach said supporting surface to form an acute angle therewith, said flexible means being adapted in said open position to extend beneath said base and to engage said cover means to hold them in the open position.

References Cited

UNITED STATES PATENTS

| | | | |
|---|---|---|---|
| 167,479 | 9/1875 | Stevens | 340—36 |
| 2,528,490 | 11/1950 | Berry | 340—90 |
| 2,678,790 | 5/1954 | Egger | 248—168 |
| 2,816,277 | 12/1957 | Salkowski | 340—81 |
| 2,918,668 | 12/1959 | Strube. | |
| 3,092,826 | 6/1963 | Klingner | 340—81 X |

FOREIGN PATENTS

| | | |
|---|---|---|
| 538,506 | 3/1922 | France. |
| 685,526 | 4/1930 | France. |
| 177,724 | 11/1906 | Germany. |
| 53,773 | 1/1943 | Netherlands. |

JOHN W. CALDWELL, Primary Examiner

KENNETH N. LEIMER, Assistant Examiner

U.S. Cl. X.R.

340—90, 366